March 1, 1960

A. LIEB 2,927,237

VOLTAGE INDICATOR TUBES

Filed March 13, 1957

INVENTOR
ALBERT LIEB
BY
ATTORNEY

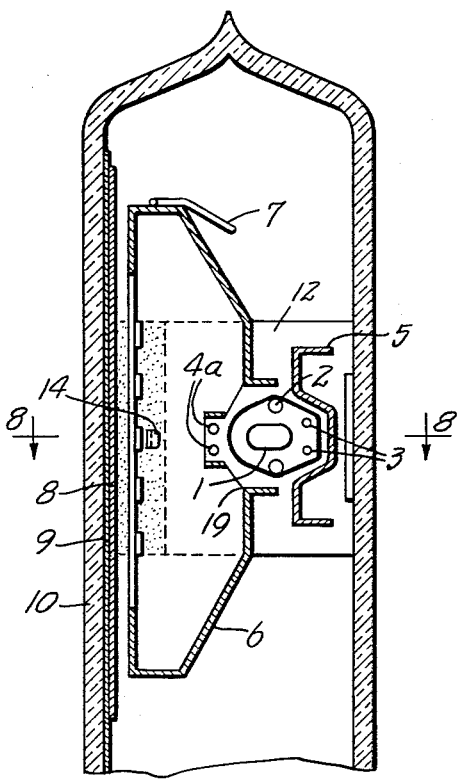
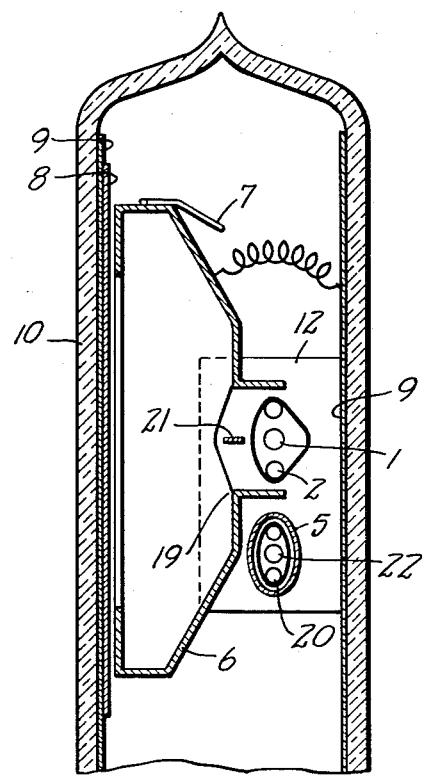
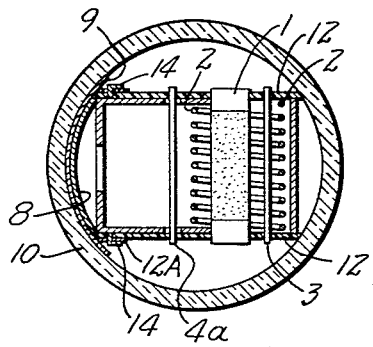

March 1, 1960      A. LIEB      2,927,237
VOLTAGE INDICATOR TUBES

Filed March 13, 1957      3 Sheets-Sheet 3

INVENTOR
ALBERT LIEB
BY
ATTORNEY

United States Patent Office 2,927,237
Patented Mar. 1, 1960

2,927,237

VOLTAGE INDICATOR TUBES

Albert Lieb, Oberesslingen (Neckar), Germany, assignor to International Standard Electric Corporation, New York, N.Y., a corporation of Delaware Application March 13, 1957, Serial No. 645,746

13 Claims. (Cl. 313—109.5)

This invention relates to voltage indicator tubes of a linear display type. By the term linear display type voltage indicator tubes is meant indicator tubes in which longitudinal expansion of the fluorescent pattern is changed by the voltage to be indicated. The width of the fluorescent pattern remains substantially constant.

Indicator tubes are known in which the voltage indication is displayed in a manner similar to that in thermometers. With these types of tubes the length of a fluorescent line is obtained by a sheetmetal-like template, a so-called control diaphragm arranged between the cathode and the luminescent screen. Along the indicating path this control diaphragm is provided with a cut out portion varying in size. In this way there results a control of the fluorescent anode on the cathode varying along the indicating path. These linear display type indicator tubes, however, have the disadvantage of low indicating sensitivity, poor focus of the fluorescent dashes and a varying luminous intensity with changes in the voltage to be indicated. Furthermore, amplification of the voltage by reasonable technical means is not possible, because to effect amplification the control diaphragm has to be brought to a positive voltage with respect to the cathode. This effects a high current at the control diaphragm which greatly reduces or cancels the controlling action of the amplifier system.

Voltage indicator tubes have also been proposed with which the size of the fluorescent pattern is changed by variation of voltage applied to a deflecting sheet arranged behind the cathode. These types of indicator tubes have the disadvantage that the luminous indicating edge of the pattern is not limited sharply enough. Also with these tubes, for the same reasons as with the aforementioned type of thermometer-like indicator tubes, it is impossible to amplify the voltage with the aid of means within reasonable technical limits. Therefore, the indicating sensitivity of such tubes is not very high.

Other thermometer type indicator tubes have been proposed with which, by the use of a control strip, there was produced a fluorescent stripe the length of which varied with the indicating voltage. Although with this kind of linear display type indicator tubes it is possible to pre-amplify the indicating voltage, the indicating sensitivity is still insufficient in many cases.

To provide an indicator tube of high sensitivity and with sharply defined indications, the invention proposes a linear display type of indicator tube in which the length and the mutual distance between two fluorescent stripes is changed under control of voltage applied to the control electrode in such a way that with an increasing control voltage the fluorescent stripes becomes longer and the mutual distance between them becomes smaller. Due to the oppositely directed movement of the two fluorescent stripes there is achieved a high indicating sensitivity. This high indicating sensitivity results principally from the fact that the human eye is capable of recognizing the change in distance between two objects, in the present case between the two luminous stripes, with a high degree of accuracy.

Tuning indicator tubes are commonly used for the tuning of radio receivers. In those cases it is the object of the tuning to determine the maximum value of a negative direct voltage produced by the receiving set. When the customary pre-amplification is used with indicator tubes, then the proper tuning of the set is determined by the minimum distance between the two luminous portions or stripes. This is so obvious that the tuning is also understood, without any explanation, by the person not skilled in the art, and is carried out more or less unconsciously by him.

Voltage indicator tubes are also useful for other purposes, for example in sound recording to avoid the possibility of over modulation.

With voltage indicator tubes, particularly when used to indicate a minimum or maximum voltage which should not be exceeded, some calibration to indicate these limits is desirable.

In accordance with this invention there is provided optical filters so arranged that whenever a certain value of the indicating voltage is exceeded, that part of the luminous pattern then displayed is of a color different from the pattern part within the tolerated range so that the color of the two pattern parts at the separation lines will be characteristic of the predetermined values.

If the filters are arranged on the outer side of the tube bulb, the color-changing point corresponding to the tolerator voltage value can be varied and suited to the conditions as, for example, to the particular permissible voltage value of the apparatus. Also when the permissible voltage value must be indicated very accurately the color-changing point can be adjusted to the indicating-property peculiar to each tube, depending on the conditions under which the tube has been manufactured.

By means of the filter arrangement several voltage values may be indicated instead of only one by providing several filters of different colors and different from each other as to their separation points.

The above-mentioned and other features and objects of this invention and the manner of attaining them will become more apparent and the invention itself will be best understood by reference to the following description of an embodiment of the invention taken in conjunction with the accompanying drawings, in which:

Fig. 6 is a modified tube structure shown in longitudinal section.

Fig. 7 is a longitudinal section of a further modified tube incorporating this invention.

Fig. 8 is a cross-sectional view along the line 8—8 of Fig. 7.

Figure 1:
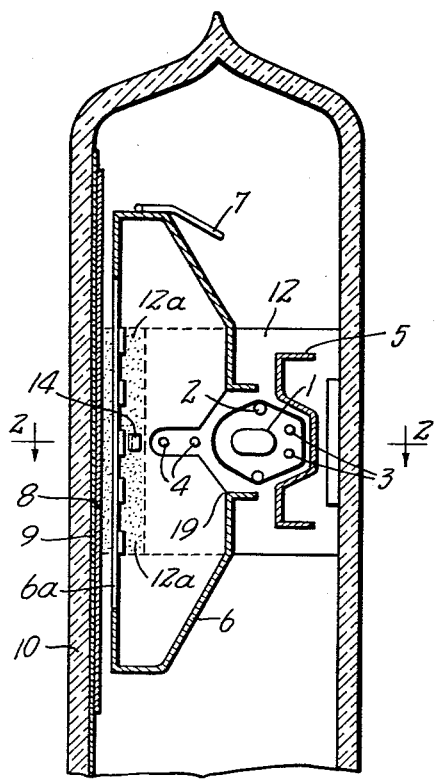
Fig. 1 is a longitudinal sectional view of a tube exemplifying this invention.
Figure 2:
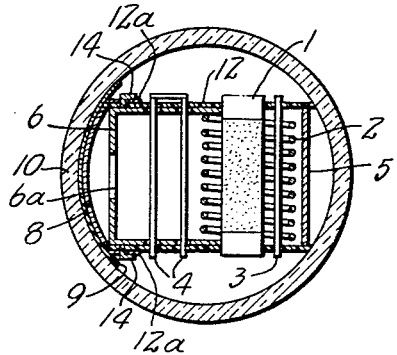
Fig. 2 is a cross-sectional view along the line 2—2 of Fig. 1.

Referring to Figs. 1 and 2, the indicating system comprises a cathode 1, a grid 2, a diaphragm 6 of conductor material, control electrode 4, a coating 8 of luminescent substance applied to the glass bulb 10, and the electrically conductive, optically transparent conductive layer 9. The cathode 1 is surrounded by grid 2. This grid is preferably electrically connected with the cathode and serves the generation of an electronic space charge. The control electrode 4 consists of two control rods, electrically connected with one another and arranged behind each other in a plane containing the cathode axis. This assembly is mounted within the glass envelope 10 by supports 12. The diaphragm 6 serves to shield the mica supports 12 from the discharge space of the picture system. In this way interfering electric charges on the mica supports or the reaction of these charges upon the indicating system are avoided. The width of the two fluorescent stripes and the outer edges thereof are determined by the slot-like opening 6a provided in the diaphragm 6. The diaphragm 6 by the provision of the angularly offset members 19, is so designed that between the cathode and the control electrode 4 a deflecting field of a high intensity is produced. By means of this field there is increased the deflecting sensitivity of the control electrode. Also by this shielding structure the amplifier system is separated from the indicating system, avoiding a disturbing mutual interaction between the two systems.

The mica supports 12 are electrically conductive at this outer edge 12a as indicated by stippling. Such an electrically conductive layer can be obtained e.g. in the conventional manner by heating the respective portion of the mica support and exposing it to the vapors of the tin-terochloride. The portion of the mica support adjacent the luminescent screen is positioned against the bulb wall under pressure. In this way there is established an electrical connection from the conductive layer 9 via the mica support to the diaphragm 6. The pressure also serves to provide a shockproof support for the indicator system within the tube. To the diaphragm 6 there is applied the positive anode voltage of the indicator system. The diaphragm 6 is provided with one or more flaps 14 to provide good electrical contact with the conductive portion of the mica support. These flaps are forced against the conductive layer of the mica support under pressure. In the upper part of the diaphragm 6 there is arranged the getter 7 which is customary with broadcasting tubes.

The part of the system formed by the cathode 1, the deflecting electrodes 3, by part of the grid 2 and by the anode 5 represents the amplifier system. The control of the discharge current is effected by the deflecting electrode 3. In this example the deflecting electrode consists of two thin round rods. These rods are electrically connected with one another; for instance they may form one unit and have the shape of a hairpin.

To achieve a stronger or more intensive control of the discharge current, the invention proposed to increase the number of rods to three, four, or still more control rods or pins. Instead of employing one space charge grid and two control rods or pins there may also be used two separate grids in place of grid 2 on the opposite sides of the cathode.

In operation of the tube a voltage, for example of 250 volts, positive with respect to the cathode, is applied to the diaphragm 6. The control electrode 4 of the indicator system is supplied with the voltage to be indicated. When the amplifier system is utilized for amplifying the indicating voltage the control electrode 4 and the anode 5, which are electrically connected with one another, are supplied, via a resistance of, for example, 0.5 ohm, with a positive voltage, such as the voltage of the diaphragm 6. The voltage to be indicated will be applied between the electrode 3 and the cathode.

Figure 3:
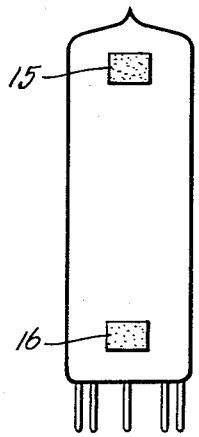
Figs. 3, 4 and 5 are diagrammatic views showing the indicating patterns for different voltages in a tube of the type shown in Figs. 1 and 2.
Figure 4:
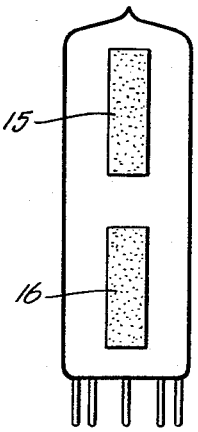
Figure 5:
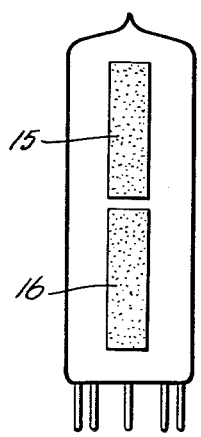

In Figs. 3, 4 and 5 is shown the fluorescent pattern produced by the indicating tube with respect to different voltages applied to the control electrode 4. Hence there will result fluorescent pattern stripes 15 and 16, the length of which and the mutual distance between which is variable by the voltage of the control electrode 4. With the pattern as shown in Fig. 3 the electrode voltage is substantially lower than the luminescent screen voltage applied to the diaphragm 6, for example, only one-tenth thereof. This corresponds to a relatively small voltage applied between the electrode 4 and the cathode. With the pattern as shown in Fig. 4 the voltage of the control electrode 4 approximately has half the value of the luminescent screen voltage. The pattern as shown in Fig. 5 will result when the voltage applied to the electrode 4 almost corresponds with the luminescent screen voltage. In the case of a pre-amplification this corresponds with a relatively large indicating voltage, which is negative with respect to the cathode, and applied to the electrodes 3.

A somewhat modified example of embodiment is given in Fig. 6. In this case the indicating system as well as also the amplifying system are arranged around separate cathodes. The amplifier system consisting of the cathode 22, the control grid 20 and the anode 5 arranged below the indicator system. On principle the indicator system corresponds to that of Fig. 1. The same component parts have been given the same reference numerals. Instead of the two or more control pins the variation in size and distance is effected in this case by means of a thin deflecting sheet 21 lying in the plane of the cathode. In the case of a pre-amplification of the indicating voltage the anode 5 is electrically connected with the deflecting sheet 21.

A variation in the structural arrangement of the indicator system is shown in Figs. 7 and 8. This indicating system consists of cathode 1, grid 2, diaphragm 6, control electrodes 4a fluorescent layer 8 deposited on the glass bulb of the tube, and the electrically conductive, optically translucent layer 9 similar to Figs. 1 and 2. The control electrodes 4a consist of two control straps which are electrically connected with each other. These control straps are not in a plane which contains the cathode axis as in Fig. 1 but are arranged symmetrically in relation to a plane perpendicular to the fluorescent screen and extending through the cathode axis.

By this arrangement there will be produced three stripes of fluorescence, so that greater sensitivity of measurement can be obtained over all ranges. The distance between the upper and lower edges may be used for measurement at one end of the range. Thus when the indicating voltage is very low the edges of the middle stripe will be very close to each other. When the indicating voltage increases then the two edges of the fluorescent stripes will move apart from each other in the opposite direction. At the relatively great distance between the two fluorescent edges of the center stripe the viewer will no longer utilize the change in the spacing of the individual fluorescent edges. Instead he will use the double sensitive indication of the spacing between this center stripe and the outer stripes as the indicating value. Thus the sensitivity of measurement is extended to the two extremes of the measurable range.

Figure 9:
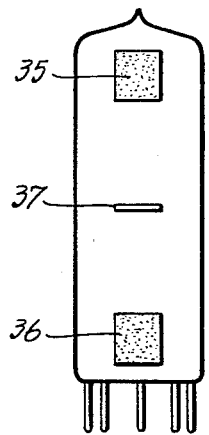
Figs. 9, 10 and 11 illustrate the type of indications produced by the tube of Figs. 7 and 8, and Fig. 12 illustrate the use of external color filters on a tube of the type shown.
Figure 10:
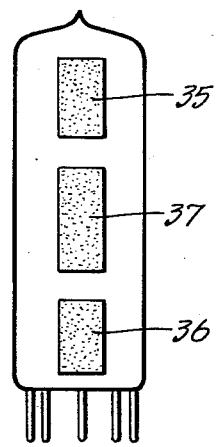
Figure 11:
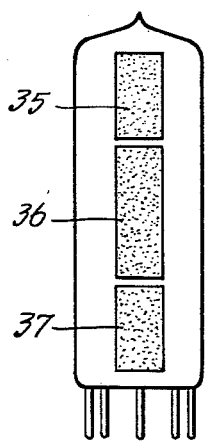

In Figs. 9, 10 and 11 there is illustrated the fluorescent pattern as produced by the indicator tube at different voltages applied to the control electrodes 4. There results the fluorescent pattern stripes 35, 36 and 37, the length and the mutual distance between which is varied by the voltage of the control electrodes 4. In regard to the fluorescent pattern as shown in Fig. 9 the voltage applied to the electrode 4 is substantially lower than the fluorescent screen voltage applied to the diaphragm 6, e.g. only amounting to one-tenth thereof. In the case of an amplification of the indicating voltage this corresponds to the voltage zero, or only to a small voltage which is negative with respect to the cathode. The middle one of the fluorescent pattern stripes 37, in this operating condition, only has a small width, that is, the two edges thereof are closely adjacent. With an increasing voltage these edges are moved apart from each other providing a particularly sensitive indication of voltage variations.

With respect to the fluorescent pattern as illustrated in Fig. 10 the voltage of the control electrodes 4 approximately have half the value of the screen voltage. The pattern as shown in Fig. 11 will result whenever the voltage applied to the electrode almost corresponds with the screen voltage. In the case of a preamplification this corresponds to a relatively high voltage which is negative with respect to the cathode.

Figure 12:
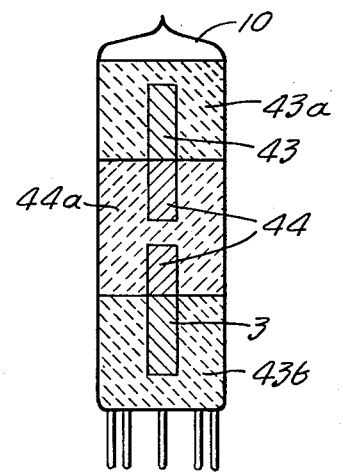

Fig. 12 shows a filter arrangement employed to indicate voltages outside a desired range in indicator tubes described above. The luminous pattern of the indicator tube consists of two narrow luminous strips whose size and mutual distance are varied by the voltage to indicate. On the external face of the bulb 10 the filters are seated. These filters are designated 43a and 43b. By 43 and 44 those spots of the filters are denoted behind which a luminous pattern is produced. According to the invention the filters 43a; 44a differ from each other as to the color absorption curve, so that at the spots 43, 44 discriminative colors of the emission from the luminous substance are effective. The separating lines between the filters 43a, 44a and 43, 44 are characteristic of the permissible voltage value. The filter layer 43a, 44a may consist of a colored celluloid strip arranged on the bulb.

In order to produce the separating line between the filters as simply and accurately as possible, the invention contemplates a constructional form that comprises a filter extending the whole length of the indicating-pattern. For instance, the bulb may be coated with a layer of some lacquer. On this filter or lacquer layer still another strip of a color filter is provided. This strip is so positioned that its delineation line indicates the allowed voltage value.

Appropriately the filters are so chosen that in each case two complementary colors shall result. In this way the highest sensitivity at daylight will be obtained.

The luminous substance for the indicator tubes should preferably be constituted by zinc oxide. Luminous substances of this nature have the following advantages: With the low voltages customarily employed in indicator tubes they result in a relatively high yield of light. Their emission of light is of long life despite the electronic bombardment, and the light emitted by them contains a large percentage in white. Due to this proportion in white rays it will be possible for sufficient surface-brightness to be obtained where discriminative color filters are employed.

What is claimed is:

1. A voltage indicator tube comprising a substantially cylindrical envelope, an electron beam producing means including a cathode positioned transversely of the axis of said envelope, a transparent conductive accelerating electrode extending substantially parallel to the axis of said envelope, and a conductive diaphragm partially surrounding said cathode and mounted between said cathode and said accelerating electrode, a fluorescent coating on said transparent conductive electrode to produce axially linear fluorescent indications in response to electrons from the produced beam, and control electrode means within said diaphragm and mounted between said cathode and said fluorescent coating in substantially parallel relation to said cathode, said control electrode means normally being negative with respect to said cathode whereby there is produced on said coating separated fluorescent stripes which increase in length and decrease in spacing between them in response to increase in voltage.

2. A tube according to claim 1, wherein said control electrode means comprises a substantially plane structure perpendicular to the axis of said tube and in a plane passing through said cathode.

3. A tube according to claim 2, wherein said control electrode means comprises spaced rods.

4. A tube according to claim 1, wherein said control electrode means comprises parallel rods mounted on opposite sides of a plane extending from said cathode perpendicularly to said fluorescent coating.

5. A tube according to claim 1, wherein said diaphragm includes a masking member close to said fluorescent material having a slot therein aligned longitudinally with said material and having a width determining the width of said fluorescent stripes.

6. A tube according to claim 1, wherein said transparent conductive electrode is directly mounted on the inner surface of said envelope.

7. A tube according to claim 1, further comprising dielectric supporting plates for supporting said beam producing means, said supporting plates being mounted externally of said conductive diaphragm whereby said diaphragm shields said beam producing means from electrostatic charges on said supporting plates.

8. A tube according to claim 7, further comprising conductive means on said supporting plates mounted in contact with said conductive electrode means and said diaphragm.

9. A tube according to claim 1, further comprising amplifier electrode elements mounted within said envelope.

10. A tube according to claim 1, further comprising light filter means mounted externally of said envelope, overlying portions of said fluorescent coating.

11. A tube according to claim 10, wherein said filter comprises a color coating on said envelope.

12. A tube according to claim 10, wherein said filter comprises light filter means at opposite ends of said envelope, spaced apart to define zones of predetermined voltage indications.

13. A tube according to claim 12, further comprising a color filter passing a contrasting color intermediate said filter means.

References Cited in the file of this patent

UNITED STATES PATENTS

| | | |
|---|---|---|
| 2,014,106 | Dumont | Sept. 10, 1935 |
| 2,098,231 | Dumont | Nov. 9, 1937 |
| 2,113,669 | Thompson | Apr. 12, 1938 |
| 2,412,350 | Morgan | Dec. 10, 1946 |
| 2,639,398 | Jacobi | May 19, 1953 |